June 13, 1933.  V. P. WILLIAMS  1,913,783
UNIVERSAL JOINT WITH LUBRICATING SHROUD
Filed Feb. 13, 1931  3 Sheets-Sheet 1
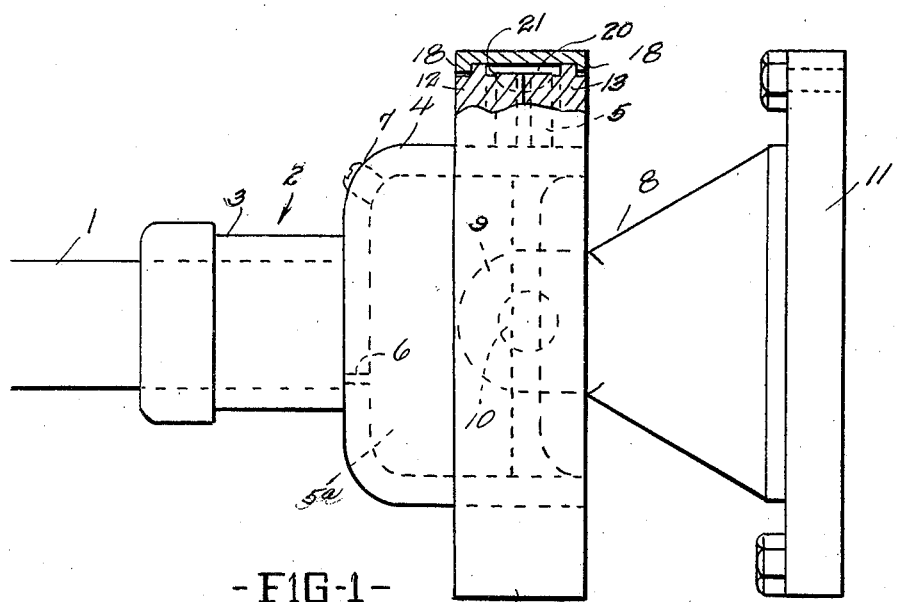
FIG-1-
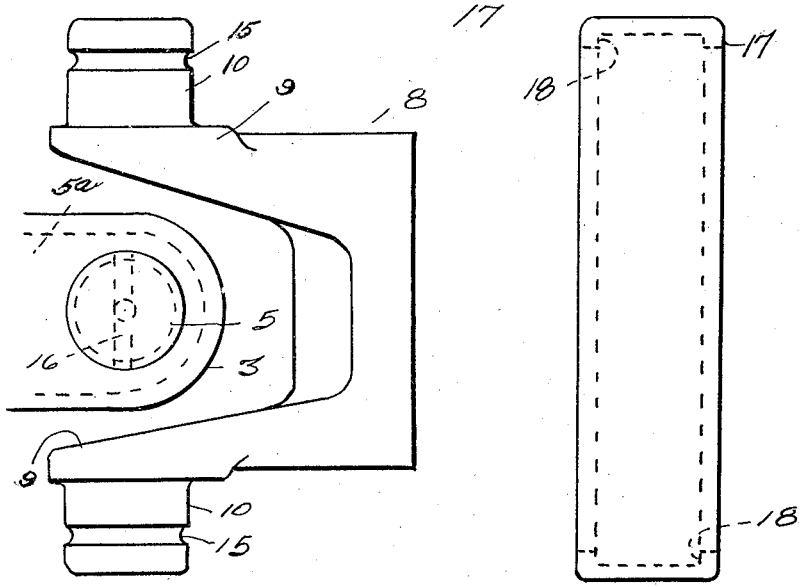
-FIG-2-   -FIG-3-
Inventor
VILLOR P. WILLIAMS.
By
Attorney

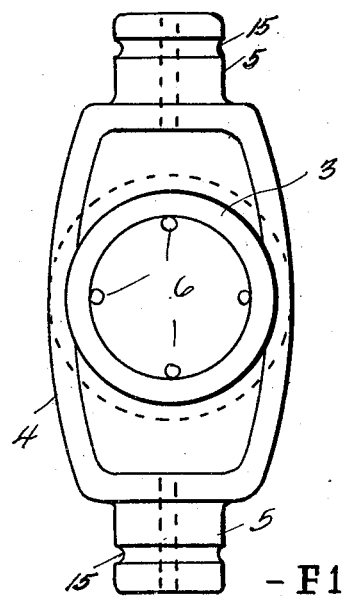
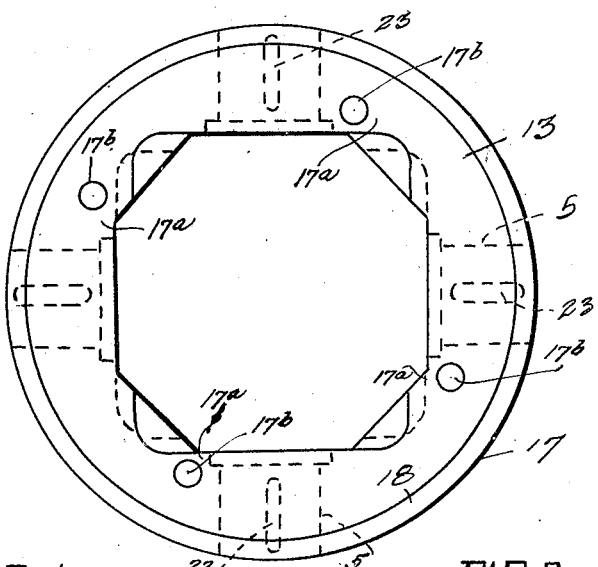
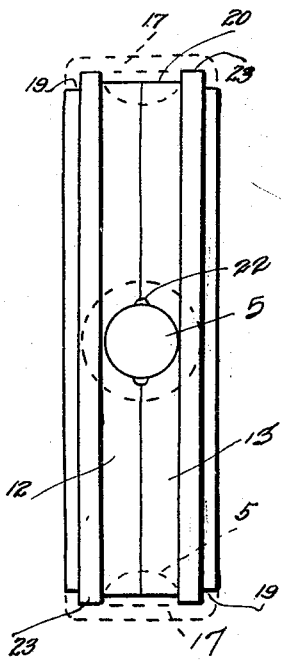
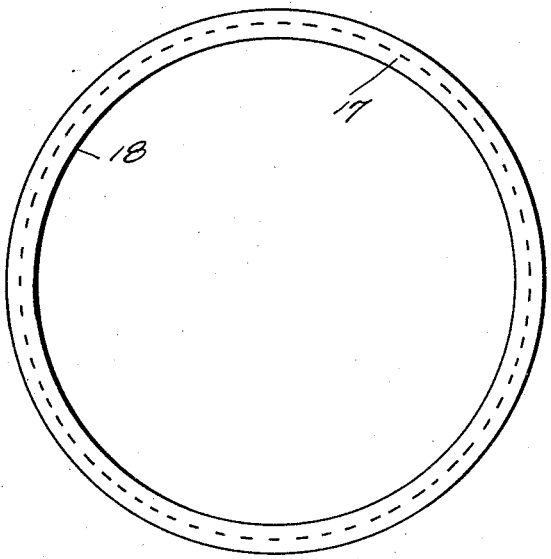
Inventor
VILLOR P. WILLIAMS

June 13, 1933. V. P. WILLIAMS 1,913,783
UNIVERSAL JOINT WITH LUBRICATING SHROUD
Filed Feb. 13, 1931  3 Sheets-Sheet 3
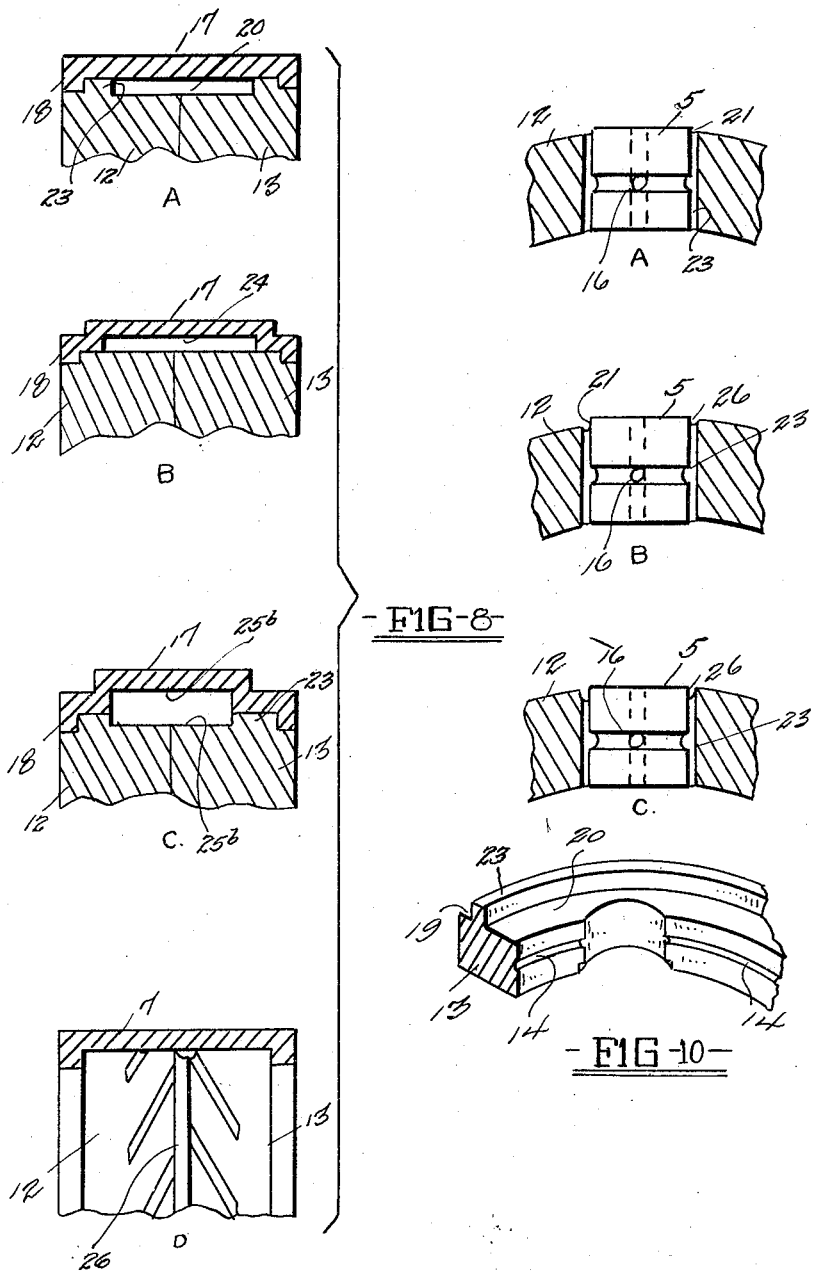
Inventor
VILLOR P. WILLIAMS
By
Attorney Patented June 13, 1933

1,913,783

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

UNIVERSAL JOINT WITH LUBRICATING SHROUD

Application filed February 13, 1931. Serial No. 515,607.

My present invention, in its broad aspect, has to do with improvements in universal joints of the type and form described in my co-pending application Serial Number 496,756, filed November 19, 1930, and wherein the ring sections of the joint are held together without the use of bolts, rivets or screws, by means of an improved shroud. In my present application means are provided for rendering more effective the lubrication of universal joints of this character, and wherein the unique and novel form of shroud figures in the complete and constant circulation of lubricant to all of the working parts of the joint.

In my present invention the type of reservoir for lubricant is used as shown in my co-pending application Serial #441,146, filed October 18th, 1930, and wherein a sealed cavity is formed in an integral part of the knuckle; from this cavity, channels for circulation of lubricant lead to the pins, and to the ring sections; the pins being bored and annularly channeled, and the opposed faces of the ring sections being annularly channeled in registry with the channels in the pins, so that a closed system of oil distribution is maintained from the cavity to all of the working parts; circulation being continuously maintained by centrifugal force. My present invention, is an improvement upon the aforementioned inventions, in that the shroud for the ring sections is provided with means for maintaining a constant circulation of oil about the periphery of the ring, and across and around the ends of the pins beneath the shroud so that more perfect lubrication is attained, and it is impossible for the lubricant to heat up when the joint is in operation. Also the pins are more fully and completely lubricated, as well as the ring sections where they engage the pins. Improved means are also provided in my present invention, and cooperating with the shroud, for holding the ring sections together in a heavy duty joint where the stress and strain is abnormally great; such means including an increase in the material of the ring sections, and pins extending therethrough to hold the sections together independent of the shroud. Furthermore my joint is greatly simplified, more efficient, and can be manufactured and sold at a relatively small price; there being no intricate and fragile parts. Neither can the joint readily get out of order, and the flow of lubricant in the closed system is constant to all parts.

Since the form and arrangement of the lubricating channels, and parts of the joint, are subject to some change without departing from the inventive concept as disclosed herein, as for instance the method of forming the channels; the scope of the invention is to be determined from the appended claims.

In the drawings wherein I have illustrated my invention and several modified forms thereof;—

Figure 1 is a side view of my joint, partly broken away to show the lubricating channel beneath the shroud;

Figure 2 is a detail of the knuckles;

Figure 3 is an edge view of the shroud;

Figure 4 is an end view of the knuckle having the sealed lubricating cavity, and shows the means for lubricating the splines to the shaft;

Figure 5 is a side view of the ring assembly;

Figure 6 is an edge view of the ring assembly;

Figure 7 is an edge elevation of the shroud;

Figure 8, views A, B, C, D are forms of lubricating channels for the shroud;

Figure 9, views A, B and C show the mode of lubricating the pins from the channel beneath the shroud, and;

Figure 10 is a fragmentary perspective of one of the ring sections.

In the drawings wherein like characters of reference are used to designate like or similar parts throughout the several views thereof—

The numeral (1) designates a driving or driven shaft to which is splined the knuckle (2) of my universal joint; this knuckle has a shank (3) and a head (4) carrying the pins (5); the knuckle (2) is not bifurcated. In the head (4) is a cavity or chamber (5a) for storage of lubricant after the manner described in my pending application on universal joints, Serial #441,146, and leading from the cavity to the splines in the shank (3) are bores (6) for lubricating the splines from the cavity. A set screw (or other means) closes the opening (7) for filling the cavity. Working in conjunction with the knuckle (2) is a bifurcated knuckle (8) the arms (9) of which carry the pins (10), and a flanged or plate coupling (11) may be carried to attach this knuckle to the driven member. The relative organization of the two knuckles 2-8, and the pins 5-10 is shown in Figure 2.

The ring for connecting the pins of the knuckles together has two sections (12) and (13) which are similar in formation, shape and size. The inner face of each ring section is annularly channeled as at (14), and the pins have registering annular channels (15) with the channel (14); each pin (5) of the knuckle (2) is bored to communicate with the cavity (5a), and radially drilled as at (16) between the channels (15) and bores, so that there is a closed system of lubrication including the cavity, the bores, the channels (15) and channels (14) constantly lubricating all of the pins 5-10 while the joint is in operation through centrifugal force, after the manner described in my pending application on system of lubrication, Serial #441,145.

In order to hold the ring sections together in assembly I provide a shroud or ring (17) which is flanged down as at (18) to engage in annular grooves (19) in the outside peripheral edges of the ring sections.

The type of joint herein illustrated is what is known as a heavy-duty joint, and is subject to great strain. Therefore in order that there may be no possibility of the joint breaking down under the strain, I provide means for cooperation with the shroud for holding the ring sections together. The material of the ring sections is appreciably increased in extent at the parts indicated (17a) in the drawings, and the web thus formed is drilled to receive either pins, rivets, bolts, screws or the like designated (17b); as shown there are four of these but there may be more or less number, and they serve to lock the sections of the ring together against possibility of coming apart, or possibility of any looseness or "working" between the sections. To this extent they cooperate with the shroud. However, it is to be noted that these additional securing devices (17b) are only necessary with relatively large, heavy-duty joints, subject to great strain. For all ordinary purposes, the members (17b) are not necessary, nor desirable, since the shroud itself serves absolutely to hold the assembly properly together for all ordinary strains (with a large margin of safety), and this is especially true with the smaller types of universal joints.

In practice the shroud is formed with but one flange only so that it may be slipped over the peripheral outside edge of the ring. The other edge of the shroud is then turned down to form the other flange and to lock the ring sections in assembly; the completed shroud with both edges flanged down being shown in Figures 3 and 7.

The organization and operation of the shroud (17) is similar to that described in my co-pending application for patent on universal joint with shroud, Serial #496,756.

In order to improve upon the means for lubricating the various working parts of my joint, and at the same time prevent heating up of the lubricant; I form a channel or groove (20) in the peripheral edge of the ring as shown in Figures 1 and 6. This groove is beneath the shroud, and forms an oil channel completely about the periphery of the ring so that oil is distributed to the ends of the pins where it is most needed; the pins 5 are drilled as at (6) so that this oil groove is a part of the system of lubrication from the cavity (5a), and the motion of the joint in action causes the lubricant to flow freely about the periphery of the ring in the groove. In practice I have found it desirable to slightly set out the ends of the pins in the groove as at (21) so that the oil, as it passes will be trapped or intercepted and will not simply flow over the tops of the pins; also each pin may have a recess about its end, after the manner which will be described in conjunction with Figure 9. Also the faces of the ring sections about the pins are grooved as at (22) so that the system of circulation is completed to all of the working faces of the pins and ring. The parts or ribs (23) of the ring sections form a bearing for the shroud.

Referring now to Figure 8, views A, B, C, D; it will be seen that the form (A) of my invention described above may be somewhat modified; for instance, the under face of the shroud itself may be either grooved or upstruck as at (24) to form an oil channel; see Figure 8—B. Or both the inner face of the shroud and the peripheral edge of the ring may both be grooved as at 25a and 25b shown in view C; or a groove 26 may be provided in the ring having leads or tap grooves as shown in view D; or a curved groove (not shown) may be used in either the shroud or ring or both. In other words the concept is to lubricate the ends and the working surfaces of the pins and the like by a continuous means for causing a flow of oil about the periphery of the ring beneath the shroud.

As shown in Figure 9 several methods may be used both to insure that the pins pick up the oil from the groove, and to direct the oil to the working surfaces of the pins. In form A the pin extends slightly out from the bottom of the oil groove, and the faces of the ring sections confronting the pins are grooved. In form B both the pins and the grooves in the face of the ring section are present, and in addition there is a groove (26) in the ring about the end of the pin. In form C the end of the pin is flush with the bottom of the groove, the ring is formed with groove (26) about the end of the pin, and the confronting face of the ring sections are grooved.

In operation the oil in cavity (5a) circulates through centrifugal force when the joint is in operation through the pins, about the ring sections through channel (14) and also in the groove (20) so that every part of the joint is completely and fully lubricated, and there are no dormant or excessive bodies of oil about the working parts which are liable to become heated or the like.

While in the foregoing special forms of my invention have been illustrated and described, it is again emphasized that the scope of my invention should only be conclusive from the subjoined claims.

I claim:—

1. In a universal joint of the type having a pair of knuckles formed with pins thereon, and a sectional ring engaging about the pins to complete the joint assembly, each of the sections of the ring having an annular rib, a ring-like shroud engaging about the periphery of the ring and seated upon the ribs and bridging across the space therebetween to form an annular closed lubricating channel, said shroud being flanged down at its edges to engage the ribs at the outside surfaces thereof to hold the ring sections together, said joint having a reservoir for lubricant, and lead off channels therefrom to the lubricating channel at the periphery of the ring thereby to induce a constant flow of lubricant in said lubricating channel, said pins projecting slightly into the lubricating channel to deflect lubricant into the space between the sides of the pins and the ring, and said ring provided with an annular groove in the ring members about each of the pins for positively trapping oil to project it positively against the surface of the pins.

2. In a universal joint of the ring and trunnion type, and having a continuous lubricating channel communicating with the outward ends of the trunnions thereby to provide a constant supply of lubricant to the trunnions; the ring being formed with a plurality of annular grooves, one about the end of each of the pins, and said grooves communicating with the lubricating channel thereby to trap lubricant to positively project it against the working surfaces of the pins.

In testimony whereof, I affix my signature.

VILLOR P. WILLIAMS.